(12) United States Patent
Turpin et al.

(10) Patent No.: US 8,061,264 B2
(45) Date of Patent: Nov. 22, 2011

(54) DEVICE FOR HEATING MILK AND COFFEE MACHINE COMPRISING SAME

(75) Inventors: Romain Turpin, Caen (FR); Nicolas Bazin, Herouville Saint Clair (FR); Pascal Meyer, Caen (FR)

(73) Assignee: SEB S.A., Ecully (FR)

( * ) Notice: Subject to any disclaimer, the term of this patent is extended or adjusted under 35 U.S.C. 154(b) by 919 days.

(21) Appl. No.: 11/661,330

(22) PCT Filed: Sep. 2, 2005

(86) PCT No.: PCT/FR2005/002207
§ 371 (c)(1),
(2), (4) Date: Mar. 17, 2008

(87) PCT Pub. No.: WO2006/030098
PCT Pub. Date: Mar. 23, 2006

(65) Prior Publication Data
US 2009/0007795 A1  Jan. 8, 2009

(30) Foreign Application Priority Data
Sep. 10, 2004 (FR) ...................................... 04 09626

(51) Int. Cl.
*A47J 31/44* (2006.01)
(52) U.S. Cl. ................. 99/323.1; 99/293; 261/DIG. 16; 261/DIG. 76

(58) Field of Classification Search .................... 99/293, 99/287, 323.1; 366/339, 137.1; 261/DIG. 16, 261/DIG. 76; 141/182, 70
See application file for complete search history.

(56) References Cited

U.S. PATENT DOCUMENTS

| | | | | |
|---|---|---|---|---|
| 2,652,234 | A | | 9/1953 | Feldmann |
| 4,053,141 | A | * | 10/1977 | Gussefeld .................... 366/339 |
| 4,088,449 | A | * | 5/1978 | Smith .......................... 422/257 |
| 5,330,266 | A | * | 7/1994 | Stubaus ........................ 366/101 |
| 5,473,972 | A | | 12/1995 | Rizzuto et al. |
| 5,611,262 | A | | 3/1997 | Rizzuto et al. |
| 5,738,002 | A | * | 4/1998 | Marano-Ducarne ........... 99/293 |
| 6,213,633 | B1 | * | 4/2001 | Kramer et al. ............... 366/339 |
| 6,499,389 | B1 | * | 12/2002 | Probst .......................... 99/323.1 |
| 6,681,685 | B2 | * | 1/2004 | Mahlich ......................... 99/453 |

FOREIGN PATENT DOCUMENTS

| | | |
|---|---|---|
| DE | 197 19 784 | 7/1998 |
| WO | 2004/004523 | 1/2004 |

* cited by examiner

*Primary Examiner* — Reginald L Alexander
(74) *Attorney, Agent, or Firm* — Young & Thompson

(57) ABSTRACT

A device for heating milk includes a body (2) having: a steam injecting conduit and a milk conduit emerging into a suction chamber; and a heating chamber (4) extending from an outlet of the suction chamber to an outlet (7) through which the heated milk can flow outside said body (2). The heating chamber (4) includes a globally helical inner conduit (40). A coffee machine including such a device is also disclosed.

14 Claims, 2 Drawing Sheets

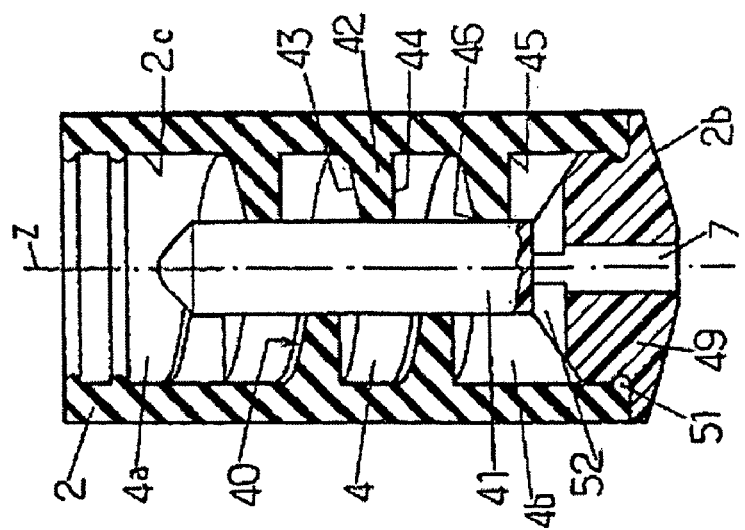
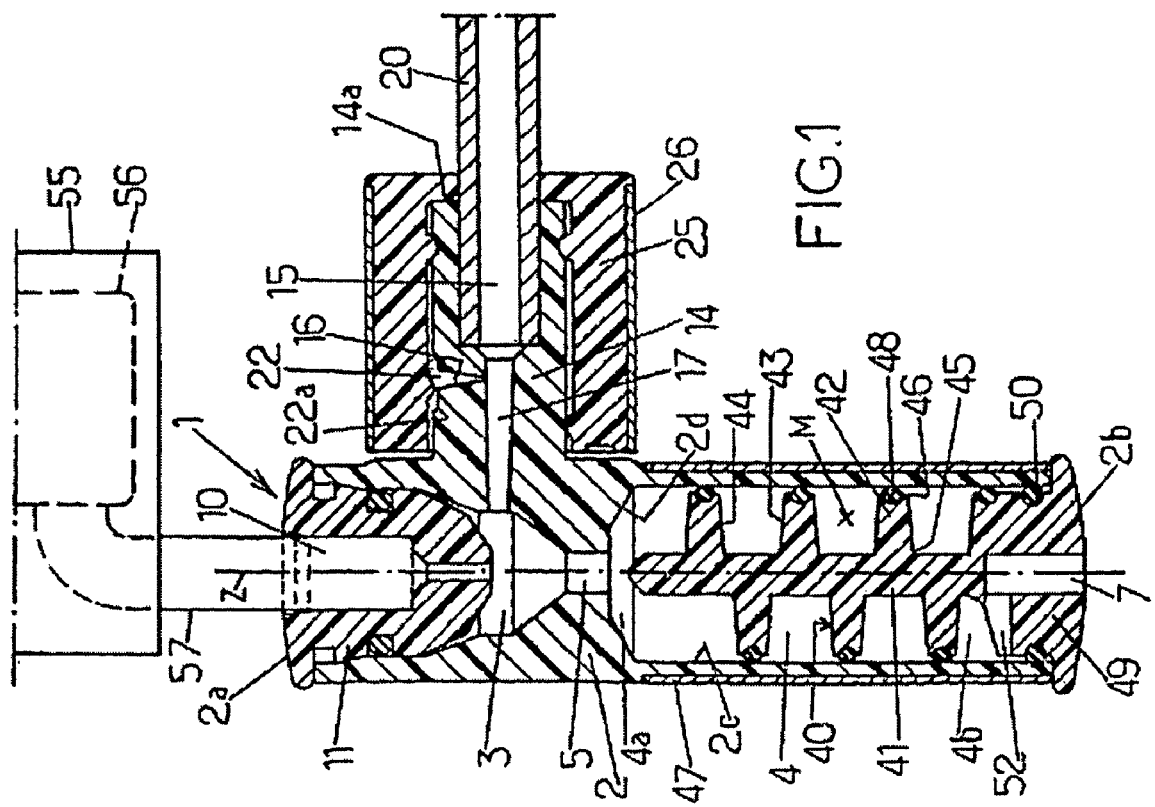

DEVICE FOR HEATING MILK AND COFFEE MACHINE COMPRISING SAME

BACKGROUND OF THE INVENTION

1. Field of the Invention

This invention relates to a device for heating milk that comprises a body including:

A steam injection hose that empties into an intake chamber and is designed to be connected to a steam source;

A hose for milk linked to the intake chamber and designed to be connected to a container that contains milk; and A heating chamber that extends from an outlet of the intake chamber to an output orifice by which the heated milk can flow outside of said body.

2. Description of the Related Art

In the field of espresso-type coffeemakers, it is known to mount such a device on a steam discharge nozzle for the purpose of either producing a milk emulsion intended for the preparation of cappuccino or producing warm milk if there is no air inlet into the intake chamber, so as to prepare coffee with milk.

For example, the document U.S. Pat. No. 5,738,002 describes a device for producing milk emulsion in which a cylindrical chamber downstream from the intake chamber is designed for the purpose of promoting the emulsion of the milk. A heating of the milk at the outlet of this cylindrical chamber of the device is noted.

However, the temperature of the frothy milk that is thus produced generally remains fairly low, in particular if the milk that is drawn in was stored in a refrigerator. In the case where the air hose is shut off, the amount of milk drawn in relative to the amount of injected steam is larger, and the temperature elevation of the milk is thereby even less significant than in the case of a production of frothy milk. Also, it may happen that the milk that exits from the device of the prior art is barely lukewarm if it was previously stored at low temperature.

SUMMARY OF THE INVENTION

The object of this invention is to remedy this drawback by proposing a device for heating milk in which the heating of the milk is improved, whereby the exiting milk is in the form of froth or liquid milk.

To this end, the object of this invention is a device for heating milk of the above-mentioned type, characterized in that the heating chamber comprises an internal hose that is helical in shape overall.

Thanks to this arrangement, the effective length of the heating chamber is considerably increased relative to a heating chamber that is cylindrical in shape overall. An extended contact of the milk with the steam, therefore a better heat exchange, and, consequently, a higher output temperature of the milk are thus obtained. It will also be noted that the helical shape of the hose makes its possible to increase its effective length without excessively increasing the axial space occupied by the chamber.

In preferred embodiments of the invention, there is also recourse to one and/or the other of the following arrangements:

The body extends along a central axis and comprises an upper end into which the steam injection hose empties, and a lower end into which the output orifice empties, whereby said body has an upper portion in which the intake chamber is arranged and a lower portion in which the heating chamber is arranged;

The hose of the heating chamber has the shape of a regular helix that extends along the central axis over at least two turns;

The lower portion of the body has an internal wall that is cylindrical in shape overall, and the hose of the heating chamber is delimited by the inside wall of the body, a central piece and a helical wing that extend between said inside wall and the piece, and is linked to the output orifice;

The helical wing has a sturdy shoulder made of the same material as the piece, and a free radial edge opposite to said sturdy shoulder and provided with a sealing means;

The piece is mounted in a removable manner in the body;

The piece has an enlarged end that forms the lower end of the body and in which the output orifice is arranged coaxially to the central axis;

The upper and lower ends of the body respectively consist of two removable plugs of which one comprises the steam injection hose and of which the other bears the piece and the helical wing;

An air hose linked to the intake chamber is provided to draw in ambient air, whereby said air hose can be selectively shut off by air control.

Further, the invention also has as its object an espresso-type coffeemaker that comprises a steam generator and a tube that has a first end connected to the steam generator and a second end forming a steam discharge, characterized in that a milk-heating device as defined above is arranged at the second end of the steam discharge tube.

BRIEF DESCRIPTION OF THE DRAWING FIGURES

Other characteristics and advantages of the invention will emerge during the following description, provided by way of nonlimiting example, with reference to the accompanying drawings, in which:

FIG. 1 is a cutaway view of a milk-heating device according to a first embodiment of the invention, which comprises a heating chamber;

FIG. 3 is a cutaway view of the heating chamber of the second embodiment.

DETAILED DESCRIPTION OF THE INVENTION

Figure 2:
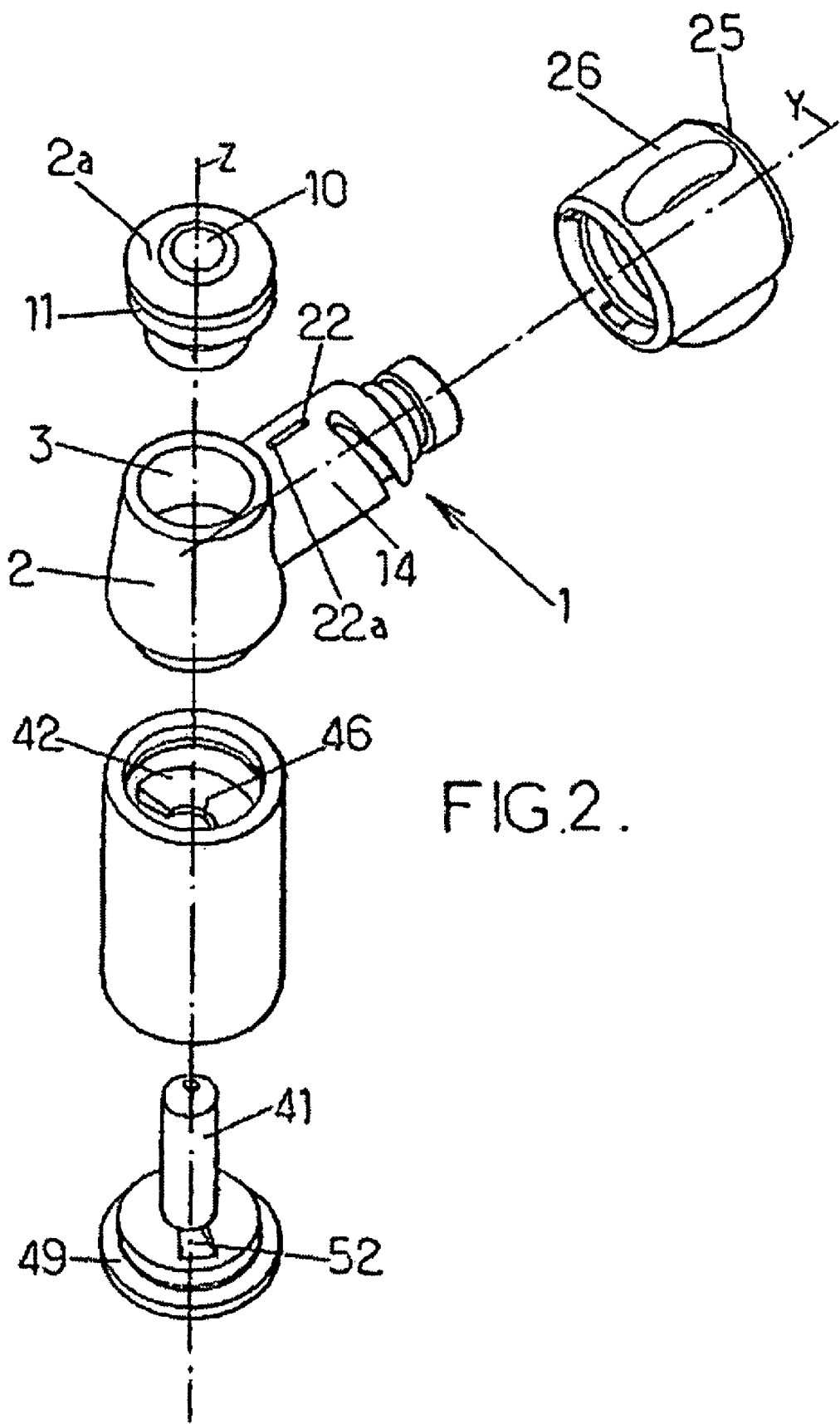
FIG. 2 is an exploded perspective view of a second embodiment.

In the various figures, identical references were preserved for designating identical or similar elements.

FIG. 1 shows a milk-heating device 1 that comprises a body 2 that extends longitudinally along a central axis Z that is cylindrical overall. The body 2 comprises an intake chamber 3 and a heating chamber 4 that are coaxial to the central axis Z. The intake chamber 3 and the heating chamber 4 are placed consecutively along the central axis Z and communicate with one another via an outlet 5 of the intake chamber. The end 4b of the heating chamber 4, opposite to the outlet 5, communicates with an output orifice 7.

The device 1 is designed to be mounted on an espresso-type coffeemaker 55, partially and diagrammatically shown in FIG. 1, which comprises a steam generator 56 and a tube 57 that forms a steam discharge. The tube 57 has a first end that is connected to the steam generator 56 and a second end on which the device 1 is mounted so that the intake chamber 3 is located above the heating chamber 4, i.e., with a central axis Z that is approximately vertical, to promote the flow of the intake chamber 3 to the heating chamber 4, then toward the output orifice 7.

The lower portion of the body 2 has a cylindrical inside wall 2c, coaxial to the central axis Z, which delimits the radial outside wall of the heating chamber 4.

The body 2 comprises a steam injection hose 10 that extends from an upper end 2a of the body 2 up to the intake chamber 3. The upper portion of the steam injection hose 10 has a diameter that is suitable for inserting in the latter the end of the steam discharge tube 57 of the espresso machine 55, and a lower portion that empties into the intake chamber 3, which has a small diameter and makes it possible to inject steam along the central axis Z. The steam injection hose 10 is formed in a plug 11 that is inserted in a removable and airtight manner in the body 2 so as to facilitate in particular the cleaning of the intake chamber 3.

The body 2 comprises a tubular arm 14 that extends radially relative to the central axis Z and is formed by a single part with the body. The arm 14 comprises a milk hose 15, an air hose 16 and a feed hose 17 that extend up to the intake chamber 3.

The milk hose 15 extends radially from the end 14a of the arm 14 and has an inside diameter that is suitable for receiving by fitting an end of a tube 20, the other end (not shown) of this tube being immersed in a container containing milk.

The air hose 16 extends perpendicularly relative to the milk hose 15 from an opening 22 that is arranged in an outside face of the tubular arm 14. The air hose 16 makes it possible to draw in ambient air owing to a selective linking with the atmosphere.

An air control 25 is mounted to rotate around the tubular arm 14. This air control 25 has an outside face 26 that is suitable for being manipulated with the fingers and an inside face that surrounds the cylindrical outside surface of the arm 14.

The air control 25 is movable between at least two positions, namely a so-called cappuccino position for which the air hose 16 is linked to the atmosphere, and a so-called hot milk position for which the air hose 16 is shut off. In cappuccino position, air and milk are drawn simultaneously into the intake chamber 3. There then forms in the latter an emulsion of milk and air that will come in the form of froth at the outlet of the device 1. In hot milk position, only milk is drawn into the intake chamber 3, and because of the steam condensation upon contact with the milk through the device, the liquid milk, virtually without froth, is obtained at the outlet of the device 1.

In the embodiments shown, the opening 22 of the air hose 16, more visible in FIG. 2, comprises a groove 22a that extends along the longitudinal axis Y of the tubular arm 14.

The feed tube 17 links the milk tube (15) and air tube (16) with the intake chamber 3 into which the milk and the air are drawn by the Venturi effect. The feed tube 17 empties perpendicularly into the steam injection hose 10 so as to promote the intake of milk and air and to obtain an air-milk-steam mixture.

The mixture that is formed in the intake chamber 3 is transferred, via the outlet 5 that is formed in the lower portion of the latter, to the heating chamber 4, then it is evacuated from the device 1 via the output orifice 7 to a lower end 2b of the body 2.

As can be seen in FIGS. 1 and 3, the heating chamber 4 comprises an internal hose 40 of helical shape, i.e., after a cylindrical zone of low height 4a that extends from the wall 2d of the body 2 that delimits the upper longitudinal end of the heating chamber 4 and into which the outlet 5 empties (see FIG. 1), the heating chamber 4 has a cross-section that varies along a helix up to the lower longitudinal end 4b of the chamber.

In the embodiments shown in FIGS. 1 and 3, the helical hose 40 is coaxial to the central axis Z and has a constant pitch and a constant radius such that it occupies the most space possible in the body 2. Likewise, the cross-section of the hose 40 is constant along the helix and has an essentially square shape. The area of this cross-section of the hose 40 is clearly greater than the section of the outlet 5 of the intake chamber 3, in particular for promoting turbulence, but it remains clearly less than the area of the internal circular section of the portion of the body 2 that delimits the radial outside wall 2c of the heating chamber 4. It is considered that a cross-section of the helical hose 40 that is between 3 and 10× the cross-section of the opening 5 makes it possible to obtain a good compromise between the heating of the milk and the formation of froth.

In the embodiments shown, the helical hose 40 extends over about 4 turns, but a helix that extends over 2 turns already has an effective length that is very clearly more than the length of a cylindrical heating chamber that extends along the central axis for a comparable space occupied. The effective length corresponds to the distance that is described by the medium M of a cross-section of the internal hose 40 when this point M varies along this hose 40.

A piece 41 is arranged inside the lower portion of the body 2, coaxially to the central axis Z. The piece 41 has the shape of a cylindrical central rod that extends over essentially the entire length of the heating chamber 4 and that delimits the radial inside wall of the helical hose 40.

One wing 42 extends in the direction of its width between the piece 41 and the cylindrical inside wall 2c of the body 2 in a radial direction relative to the central axis Z. The wing 42 extends longitudinally along a helix over the major portion of the piece 41. The face 43 of the wing 42 that is oriented upward delimits the lower longitudinal wall of the hose 40, while the opposite wall 44, oriented downward, of the wing 42 delimits the upper longitudinal wall of the hose 40. The diameter of the piece 41 and the thickness of the wing 42 are selected such that the helical hose 40 occupies the major portion of the volume that is defined by the inside cylindrical wall 2c of the lower portion of the body 2.

In the first preferred embodiment that is shown in FIG. 1, the helical wing 42 has a sturdy shoulder 45 that is made of the same material as the piece 41, and a radial outside edge 46, opposite to the sturdy shoulder 45, which is free. Thus, the piece 41 can be molded by means of a mold that comprises two half-shells that are moved relative to one another in a radial direction.

To ensure the sealing between the free edge 46 of the wing 42 and the inside wall 2c of the body 2, a sealing means 48 is provided on the free edge 46 of the wing. In the embodiment shown in FIG. 1, it is an elastomer flange that is directly cast onto the free end 46 of the wing 42 and slightly compressed against the inside cylindrical wall 2c. It will be noted that the piece 41 and the body 2 are made of relatively rigid plastic and that the rigidity of the lower portion of the body 2 can be reinforced by the presence of an outside metallic ring 47. However, the presence of plastic material makes it possible to limit the heat losses of the device 1.

In the second embodiment shown in FIGS. 2 and 3, the radial outside edge of the helical wing 42 forms a sturdy shoulder 45 that is made of the same material as the lower portion of the body 2, while the free end 46 of the wing 42 comes into contact with the cylindrical piece 41 to delimit the helical hose 40 of the heating chamber 4. The lower portion of the body 2 that comprises the helical wing 42 can be made by injection in a mold that comprises an insert that is withdrawn in a helical movement.

For this second embodiment, the lower portion of the body 2 is preferably made of a plastic material that is elastically deformable, which makes it possible to obtain a relatively airtight contact between the free end 46 of the wing 42 and the central piece 41. It will be noted that in this second embodiment, the lower portion of the body 2, shown in FIG. 3, forms an independent part of the upper portion of the body 2, which are attached to one another by elastic clamping of the lower portion on the upper portion of the body 2.

In the two embodiments shown, the piece 41 has an enlarged lower end 49 whose outside diameter corresponds approximately to the outside diameter of the body 2. This lower end 49 of the piece 41 forms a plug that closes the heating chamber 4. The inside space that is delimited by the wall 2c of the body 2 can thus be demolded along the central axis Z.

It will be noted that the piece 41 is mounted in a removable manner in the body 2, which facilitates the cleaning of the heating chamber 4. In the first embodiment, FIG. 1, the plug 49 comprises an O-ring seal 50 that ensures both the sealing and the holding of the piece 41 in the body 2.

In the second embodiment, FIGS. 2 and 3, holding the piece 41 is ensured by an inside flange 51 that is formed at the lower end of the body 2, which elastically encircles the enlarged lower end 49 of the piece 41.

In the two embodiments, the output orifice 7 is arranged in the center of the plug 49 that is integrally formed with the piece 41 and coaxially to the central axis Z, which facilitates the recovery of the milk froth or the hot milk in a cup of coffee.

The output orifice 7 is linked to the lower end 4b of the hose 40 of the heating chamber 4 by one or more channels 52.

The heating device 1 is mounted on an espresso-type coffeemaker 55, which comprises in a known manner a steam generator 56 to which is connected the first end of a tube 57. The tube 57 has a second end that forms a steam discharge on which the device 1 is mounted. This assembly can be permanent or removable to form, in the latter case, an accessory of the coffeemaker 55.

To produce the hot milk or a milk emulsion, according to the position of the air control 25, the user immerses the end of the flexible tube 20 into a container that contains milk and controls the production and/or the steam discharge. The steam that is injected into the intake chamber 3 via the steam injection hose 10 creates a depression that draws in milk and optionally air. Because of the force of the steam and the arrangement of the heating chamber 4 under the intake chamber 3, the mixture that is formed in the intake chamber 3 flows toward the heating chamber 4 via the orifice 5. The mixture of milk, steam and optionally air flows through the hose 40 from the heating chamber 4 at a speed that is less than that obtained through the outlet 5 and in a helical trajectory of which the effective length is clearly greater than the height, measured along the central axis Z, of the heating chamber 4. The mixture then flows through the channel 52 toward the output orifice 7.

The invention claimed is:

1. A device for heating milk that comprises a body (2) including:
   a steam injection hose (10) that empties into an intake chamber (3) and is designed to be connected to a steam source;
   a hose for milk (15) that is linked to the intake chamber (3) and designed to be connected to a container that contains milk;
   a heating chamber (4) that extends from an outlet (5) of the intake chamber (3) to an output orifice (7) by which the heated milk can flow outside of said body (2), the heating chamber (4) comprising an internal hose (40) that is helical in shape overall, the body (2) extending along a central axis (z), and the hose (40) of the heating chamber (4) has a shape of a regular helix that extends along the central axis (z) over at least two turns; and
   an upper end (2a) into which the steam injection hose (10) empties, and a lower end (2b) into which the output orifice (7) empties, whereby said body (2) has an upper portion in which the intake chamber (3) is arranged, and a lower portion in which the heating chamber (4) is arranged, the lower portion of the body (2) having an inside wall (2c) that is cylindrical overall and wherein the hose (40) of the heating chamber (4) is delimited by the inside wall (2c) of the body, whereby a central piece (41) and a helical wing (42) extend between said inside wall (2c) and said piece (41) and are linked to the output orifice (7),
   wherein the helical wing (42) has a sturdy shoulder (45) that is made of the same material as the piece (41) and a free radial edge (46) that is opposite to said sturdy shoulder and provided with a sealing means (48).

2. The device according to claim 1, wherein the piece (41) is mounted in a removable manner in the body (2).

3. The device according to claim 1, wherein the upper end (2a) and the lower end (2b) of the body (2) respectively are formed of two removable plugs (11; 49) of which one (11) comprises the steam injection hose (10) and of which the other (49) bears the piece (41) and the helical wing (42).

4. The device according to claim 1, wherein an air hose (16) that is linked to the intake chamber (3) is provided to draw in ambient air, whereby said air hose (16) can be selectively shut off by an air control (25).

5. An espresso coffeemaker (55) that comprises a steam generator (56) and a tube (57) that have a first end that is connected to the steam generator (56) and a second end that forms a steam discharge, wherein a milk-heating device (1) according to claim 1 is arranged at the second end of the steam discharge tube (57).

6. The device according to claim 1, wherein the lower portion of the body (2) has an inside wall (2c) that is cylindrical overall and wherein the hose (40) of the heating chamber (4) is delimited by the inside wall (2c) of the body, whereby a central piece (41) and a helical wing (42) extend between said inside wall (2c) and said piece.

7. The device according to claim 1, wherein the piece (41) is mounted in a removable manner in the body (2).

8. The device according to claim 1, wherein the piece (41) has an enlarged end (49) that forms the lower end (2b) of the body (2) and wherein the output orifice (7) is arranged coaxially to the central axis (Z).

9. The device according to claim 2, wherein the piece (41) has an enlarged end (49) that forms the lower end (2b) of the body (2) and wherein the output orifice (7) is arranged coaxially to the central axis (Z).

10. The device according to claim 1, wherein the upper end (2a) and the lower end (2b) of the body (2) respectively consist of two removable plugs (11; 49) of which one (11) comprises the steam injection hose (10) and of which the other (49) bears the piece (41) and the helical wing (42).

11. The device according to claim 2, wherein the upper end (2a) and the lower end (2b) of the body (2) respectively are formed of two removable plugs (11; 49) of which one (11) comprises the steam injection hose (10) and of which the other (49) bears the piece (41) and the helical wing (42).

12. A device for heating milk that comprises a body (2) including:
- a steam injection hose (10) that empties into an intake chamber (3) and is designed to be connected to a steam source;
- a hose for milk (15) that is linked to the intake chamber (3) and designed to be connected to a container that contains milk;
- a heating chamber (4) that extends from an outlet (5) of the intake chamber (3) to an output orifice (7) by which the heated milk can flow outside of said body (2), the heating chamber (4) comprising an internal hose (40) that is helical in shape overall, the body (2) extending along a central axis (z), and the hose (40) of the heating chamber (4) has a shape of a regular helix that extends along the central axis (z) over at least two turns; and
- an upper end (2*a*) into which the steam injection hose (10) empties, and a lower end (2*b*) into which the output orifice (7) empties, whereby said body (2) has an upper portion in which the intake chamber (3) is arranged, and a lower portion in which the heating chamber (4) is arranged, the lower portion of the body (2) having an inside wall (2*c*) that is cylindrical overall and wherein the hose (40) of the heating chamber (4) is delimited by the inside wall (2*c*) of the body, whereby a central piece (41) and a helical wing (42) extend between said inside wall (2*c*) and said piece (41) and are linked to the output orifice (7),
- wherein the piece (41) has an enlarged end (49) that forms the lower end (2*b*) of the body (2) and wherein the output orifice (7) is arranged coaxially to the central axis (Z).

13. The device according to claim 12, wherein the upper end (2*a*) and the lower end (2*b*) of the body (2) respectively are formed of two removable plugs (11; 49) of which one (11) comprises the steam injection hose (10) and of which the other (49) bears the piece (41) and the helical wing (42).

14. A device for heating milk that comprises a body including:
- a steam injection hose that empties into an intake chamber and is designed to be connected to a steam source;
- a hose for milk that is linked to the intake chamber and designed to be connected to a container that contains milk;
- a heating chamber that extends from an outlet of the intake chamber to an output orifice by which the heated milk can flow outside of said body, wherein the heating chamber comprises an internal hose that is helical in shape overall, the body extends along a central axis, and the hose of the heating chamber has a shape of a regular helix that extends along the central axis over at least two turns; and
- an upper end into which the steam injection hose empties, and a lower end into which the output orifice empties, whereby said body has an upper portion in which the intake chamber is arranged, and a lower portion in which the heating chamber is arranged, the lower portion of the body having an inside wall that is cylindrical overall and wherein the hose of the heating chamber is delimited by the inside wall of the body, whereby a central piece and a helical wing extend between said inside wall and said piece and are linked to the output orifice,
- wherein the helical wing has a sturdy shoulder that is made of the same material as the piece and a free radial edge that is opposite to said sturdy shoulder and provided with a sealing means.

\* \* \* \* \*